United States Patent Office 3,661,965
Patented May 9, 1972

3,661,965
PROCESS FOR THE PRODUCTION OF ISONITRILES
Dieter Arlt, Cologne-Buchheim, and Hermann Hagemann, Cologne-Flittard, Germany, and Peter Hoffmann, Hollywood, and Ivar Ugi, Santa Monica, Calif., assignors to Farbenfabriken Bayer Aktiengesellschaft, Leverkusen, Germany
No Drawing. Filed Feb. 10, 1969, Ser. No. 798,101
Claims priority, application Germany, Feb. 24, 1968, P 16 68 100.8
Int. Cl. C07c *121/00, 121/12*
U.S. Cl. 260—464                            6 Claims

ABSTRACT OF THE DISCLOSURE

Process for producing isonitriles wherein an N-monosubstituted formamide is reacted with an acylating agent at a pH-value of between 4 and 14 in the presence of a hydrophobic solvent and of a base.

---

It is known that isonitriles can be produced by dehydrating N-monosubstituted formamides, acyl halides accompanied by bases being used as dehydrating agents. The process using phosgene and tertiary amines is distinguished by its particularly wide range of application [Angewandte Chemie, 77, 494 (1965)].

One disadvantage of this process, which has hitherto been the most effective method of producing isonitriles, is that anhydrous bases are used as auxiliaries. Although tertiary amines, for example, which accumulate after the reaction in the form of, for instance, hydrochlorides, can largely be recovered by working up, the expense involved in their recovery increases the cost of producing isonitriles from formamides.

The present invention relates to a process for the production of isonitriles which comprises reacting a N-monosubstituted formamide of the general formula

wherein R represents an optionally substituted aliphatic or cycloaliphatic radical or an optionally substituted araliphatic or aromatic hydrocarbon radical, with at least the equimolar quantity of an acylating agent in the presence both of a hydrophobic solvent and of an aqueous solution or suspension of an inorganic base and/or of a basic salt, at a pH of about 4 to 14.

This process avoids the use of an anhydrous auxiliary such as a tertiary amine.

Surprisingly the reaction takes place in the presence of aqueous solutions, though the acylating agents are expected to be hydrolysed without reacting with the N-substituted formamides, and the isonitrile formed and the intermediate stage (I) of the acylated formamide are expected to be reconverted into formamide by reaction with water:

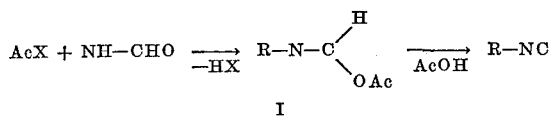

I

Compounds as described in Angewandte Chemie, 77, 492 (1965) may be used as acylating agents. Examples include phosgene; aryl sulphochlorides such as benzene or toluene sulphochloride; alkyl sulphochlorides such as methane sulphochloride and butane sulphochloride; phosphorous oxychloride; and cyanuric chloride. These materials have to be present in at least equimolar amounts, however an excess is not detrimental to the process.

The process according to the invention may be carried out with N-monosubstituted formamides of the formula:

wherein R represents an optionally substituted aliphatic radical with from 1 to 24 carbon atoms, which may optionally contain up to 2 double bonds or 1 triple bond; an optionally substituted cycloaliphatic radical with from 3 to 12 (preferably from 5 to 7) ring members; or an optionally substituted araliphatic or aromatic hydrocarbon radical with from 6 to 20 (preferably from 6 to 14) carbon atoms, aryl preferably being phenyl or naphthyl and alkyl preferably having a $C_1$ to $C_4$ carbon chain.

The following are suitable substituents for the aliphatic radical: halogen (preferably fluorine, chlorine, or bromine); $NO_2$; sulphonic acid esters; cyano; alkoxy; carboxylic esters; carbonamide (optionally substituted by lower alkyl); or NCS. An aryl or araliphatic radical may optionally contain one or more of the following substituents: halogen (preferably fluorine, chlorine, or bromine); $NO_2$; alkyl with from 1 to 12 (preferably from 1 to 6) carbon atoms; sulphonic acid ester; CN; lower alkoxy; carboxylic acid ester; carbonamide (optionally substituted with lower alkyl); or NCS.

Preferred substituents for the cycloaliphatic radical include alkyl with from 1 to 12 (and preferably with from 1 to 6) carbon atoms; nitro; cyano; lower alkoxy and halogen (preferably fluorine, chlorine, or bromine).

The following N-monosubstituted formamides are examples of suitable starting materials: methyl formamide; ethyl formamide; propyl formamide; allyl formamide; tert.-butyl formamide; n-hexyl formamide; i-dodecyl formamide; i-hexadecyl formamide; n-octadecyl formamide; N-formylvaline methyl ester; cyclohexyl formamide; cyclo-octyl formamide; benzyl formamide; 2,6-dimethylphenyl formamide; 2-methyl-6-ethylphenyl formamide; 2,6-diethyl-4-methylphenyl formamide; 2-methyl-3-chlorophenyl formamide; and 2,2′,6,6′-tetra-isopropyl-diphenyl-methane-4,4′-bis-formamide.

Most preferred N-substituted formamides are N-alkyl-formamide (alkyl $C_1$–$C_{18}$), N-cycloalkyl-formamide ($C_5$–$C_7$), N-benzyl-formamide, N-phenyl-formamide and N-(alkylphenyl)-formamide.

The process of the invention is carried out at a temperature of from about −20 to about +40° C. (and preferably at a temperature of from about −10 to about +30° C.). In one convenient embodiment, the acylating agent is added to a vigorously stirred mixture of the formamide dissolved in a hydrophobic solvent and the aqueous phase, whilst the mixture is kept at the desired pH-value by introducing into it an inorganic base or basically reacting salt. The process may be carried out at pH-values in the range from about 4 to 14, preferably in the range from about 6 to 12, pH-values of from 7 to 10 being particularly suitable.

Hydrophobic solvents as described for example in Houben-Weyl: "Methoden der organischen Chemie," fourth edition, vol. I/1, p. 371 et seq., may be used as the hydrophobic solvents, providing they are inert with respect to the acylating agent used. Examples of preferred hydrophobic solvents include aliphatic and aromatic hydrocarbons such as petrol, benzene, or toluene; and chlorinated aliphatic or aromatic solvents, such as methylene chloride, chloroform, carbon tetrachloride, dichloroethane, chlorobenzene, o-dichlorobenzene and trichlorobenzene. Acetic ester, anisole, nitrobenzene and carbon disulphide are particularly suitable.

The usual hydroxides, carbonates and bicarbonates of the alkali metals and alkaline earth metals may be used as the inorganic bases, sodium hydroxide, potassium hydroxide and calcium hydroxide being preferred. NaHCO$_3$, KHCO$_3$, Na$_2$CO$_3$, K$_2$CO$_3$ and alkali metal phosphates are examples of particularly suitable basically reacting salts.

If the formamide used in accordance with the invention is not completely reacted, the isonitrile may be separated, for example by fractional distillation, and the formamide reused as starting material.

The isonitriles obtained by the process according to the invention are known compounds which may be used as intermediate products for plant protection agents and which may also be directly used for plant protection.

EXAMPLE 1

Tertiary butylisonitrile

A mixture of 150 g. of tert.-butyl formamide, 1000 ml. of o-dichlorobenzene and 50 ml. of water is vigorously stirred in a flask equipped with stirring mechanism, thermometer, pH-measuring electrode, gas inlet pipe and dropping funnel. At the same time, whilst cooling to a temperature from 0 to +5° C., 240 g. of phosgene are introduced, and 270 g. of sodium hydroxide dissolved in 600 ml. of water are added dropwise at such a rate that the pH-water shows a pH-value of from 7 to 8. On completion of the reaction, the reaction mixture is separated in a separating funnel, and the aqueous phase is extracted by shaking with 150 ml. of dichloro benzene. Approximately 3 g. of ammonia are introduced into the combined organic phases, and sodium sulphate is added as drying agent. After drying, the product is subjected to fractional distillation.

Tert.-butylisonitrile is obtained in a yield of 87.5 g. (71% of the theoretical), B.P.$_{753}$ 92° C.

EXAMPLE 2

190.5 g. (1.5 mols) of cyclohexyl formamide dissolved in 500 ml. of methylene chloride are introduced into the reaction vessel with 100 ml. of water, and a solution of 300 g. (7.5 mols) of sodium hydroxide in 700 ml. of water is added with vigorous stirring at +5° C. over a period of 5½ hours, during which 230 g. (2.3 mols) of phosgene are simultaneously introduced. The pH-value is kept between 7 and 8 by regulating the supply of phosgene (pH-meter). On completion of the reaction, the bicarbonate that separates is dissolved by adding a solution of 80 g. (2 mols) of NaOH in 200 ml. of water, the organic phase is separated off and ammonia is introduced for some 10 to 20 minutes in order to destroy any traces of phosgene that may be left. After filtration, the methylene chloride is distilled off under reduced pressure at a bath temperature of from 20 to 40° C. and the residue is distilled in vacuo. B.P. 62° C./torr. Yield: 142.5 g. of cyclohexyl isonitrile (87.2% of the theoretical).

EXAMPLE 3

In contrast to Example 2, a suspension of 600 g. of sodium bicargonate in 500 ml. of water is introduced into the reaction vessel, instead of controlling the pH-value and adding sodium hydroxide, and the excess bicarbonate dissolved with a correspondingly larger quantity of sodium hydroxide.

Yield: 116 g. of cyclohexyl isonitrile (71% of the theoretical).

EXAMPLE 4

In contrast to Example 1, ethyl acetate is used as the solvent and the phosgene is added over a period of 2 hours. Distillation gives 75 g. of cyclohexyl isonitrile and 57 g. of cyclohexyl formamide.

Yield: 66% of the theoretical.
Conversion: 70% of the theoretical.

EXAMPLE 5

202 g. (1.5 mols) of benzyl formamide are reacted for 2½ hours with phosgene/bicarbonate as in Example 3 and the reaction product is worked up.

EXAMPLE 6

2,6-diethyl-4-methylphenyl isonitrile 100 g. of 2,6-diethyl-4-methylphenyl formamide are finely distributed in 400 ml. of methylene chloride and the resulting mixture is stirred with 100 ml. of water. Phosgene is introduced at +5° C. and at the same time a solution of 120 g. of sodium hydroxide in 500 ml. of water is added in such a way that a pH-value of from 8 to 10 is indicated by a pH-measuring electrode arranged in the reaction vessel. On completion of the reaction, the organic phase is separated off and dried with sodium sulphate. Fractional distillation gives 2,6-diethyl-4-methylphenyl isonitrile of B.P.$_{0.6}$ 109–112° C. in a yield of 65 g. (72% of the theoretical).

EXAMPLE 7

2-methyl-6-ethylphenyl isonitrile 239 g. of 2-methyl-6-ethylphenyl formamide are dissolved in 600 ml. of methylene chloride and the resulting solution is vigorously stirred with 100 ml. of water. 310 g. of phosgene are introduced with cooling over a period of 3 hours at +5° C. and at the same time 340 g. of sodium hydroxide, dissolved in 1 litre of water are added at such a rate that the aqueous phase has a pH-value of 10. The phases are then separated, 5 g. of ammonia being introduced into the organic phase. After drying with sodium sulphate, the product is subjected to fractional distillation.

In addition to 85 g. of unchanged 2-methyl-6-ethyl phenyl formamide, 2-methyl-6-ethylphenyl isonitrile of B.P.$_{0.5}$ 75–80° C. is obtained in a yield of 92 g. (65% of the theoretical).

EXAMPLE 8 i-dodecyl isonitrile from tetrapropylene 252 g. of commercial tetrayropylene are added dropwise at 0° C. to a vigorously stirred solution of 180 g. of 90% by weight sulphuric acid in 250 ml. of hydrocyanic acid. The mixture is then stirred for another 6 hours at 25 to 30° C. Excess hydrocyanic acid is distilled off and the reaction product is poured into ice water and separated. Crude N-i-dodecyl formamide is thus obtained, and is then reacted by the process according to the invention. The crude i-dodecyl formamide is dissolved in 500 ml. of methylene chloride and the resulting solution is reacted at 0 to +5° C. with 195 g. of phosgene, whilst 230 g. of sodium hydroxide dissolved in 700 ml. of water is added over a period of 2 hours at such a rate that the pH-value of the reaction mixture remains in the range from 7.5 to 8.5. The crude isonitrile dissolved in methylene chloride is separated, dried with sodium sulphate and distilled. An isonitrile mixture boiling at 65 to 110° C./0.3 torr and mainly comprising i-dodecyl isonitrile is obtained in a yield of 210 g. (2% of the theoretical based on tetrapropylene used).

EXAMPLE 9

Tert.-butylisonitrile 180 g. of benzene sulphochloride are added at a reaction temperature of 275° C. to a stirred mixture of 500 ml. of dichlorobenzene, 101 g. of tert.-butyl formamide and 100 ml. of water. At the same time, 20% by weight sodium hydroxide is run in dropwise at such a rate that a submerged measuring electrode indicates a pH-value of from 8 to 10. On completion of the reaction, which lasts for some 3 hours, the phases are separated. The dichlorobenzene solution is dried over sodium sulphate and the isonitrile formed is separated by fractional distillation. Tert.-butyl isonitrile boiling at 91 to 93° C./760 torr is obtained in a yield of 41 g. (49% of the theoretical).

EXAMPLE 10

45 g. (57% of the theoretical) of tert.-butylisonitrile of B.P.$_{753}$ 92° C. are obtained as in Example 1 from 150 g. of tert.-butyl fromamide and 240 g. of phosgene.

What is claimed is:

1. Process for producing isonitriles which comprises reacting an N-monosubstituted formamide of the formula

R—NH—CHO wherein R represents an aliphatic radical with from 1 to 24 carbon atoms, said aliphatic radical containing 0 to 2 carbon to carbon double bonds, said aliphatic radical containing at most one carbon to carbon triple bond, said aliphatic radical being unsubstituted hydrocarbon or a substituted form thereof substituted solely by a substituent selected from the group consisting of halogen, $NO_2$, —NCS, sulphonic acid lower alkyl esters, cyano, alkoxy, carboxylic lower alkyl esters, carbonamide, and said carbonamide substituted by lower alkyl;

a cycloaliphatic radical with from 3 to 12 ring members, said cycloaliphatic radical being unsubstituted hydrocarbon or a substituted form thereof substituted form thereof substituted solely by a substituent selected from the group consisting of alkyl with from 1 to 12 carbon atoms, nitro, cyano, lower alkoxy and halogen;

an araliphatic or aromatic hydrocarbon radical with from 6 to 20 carbon atoms, or said araliphatic or aromatic radical substituted with a substituent solely selected from the group consisting of halogen, $NO_2$, —NCS, alkyl with from 1 to 12 carbon atoms, sulphonic acid lower alkyl esters, CN, lower alkoxy, carboxylic lower alkyl esters, carbonamide, and said carbonamide substituted with lower alkyl;

with at least an equimolar quantity of an acylating agent in the presence of a hydrophobic solvent inert with respect to the acylating agent and an aqueous solution or suspension of an inorganic base selected from the group of alkali and alkaline earth metals, hydroxides, carbonates and bicarbonates and phosphate salts of the foregoing, at a pH value of from about 4 to about 14 and at a temperature of from about —20 to about 40° C.

2. Process according to claim 1 wherein the N-monosubstituted formamide is an N-$C_1$–$C_{18}$ alkyl-formamide, an N-benzyl-formamide, an N-phenyl-formamide, an N-($C_1$–$C_{18}$ alkylphenyl)-formamide and an N-$C_5$–$C_7$ cycloalkyl-formamide.

3. Process according to claim 1 wherein said acylating agent is phosgene.

4. Process according to claim 1 wherein said acylating agent is an $C_6$–$C_7$ arylsulphochloride, an $C_1$–$C_4$ alkylsulphochloride, phosphorous oxychloride or cyanuric chloride.

5. Process according to claim 1 wherein said hydrophobic solvent is an aliphatic or aromatic hydrocarbon and chlorinated hydrocarbon.

6. Process according to claim 1 wherein said inorganic base is sodium or potassium hydroxide.

References Cited

UNITED STATES PATENTS

| | | | |
|---|---|---|---|
| 3,405,160 | 10/1968 | Eholzer et al. | 260—464 X |
| 3,419,546 | 12/1968 | Fetzer et al. | 260—464 X |
| 3,419,596 | 12/1968 | Fetzer et al. | 260—464 X |

JOSEPH P. BRUST, Primary Examiner

U.S. Cl. X.R.

260—454, 465 B, 465.2

PO-1050
(5/69)

UNITED STATES PATENT OFFICE
CERTIFICATE OF CORRECTION

Patent No. 3,661,965          Dated May 9, 1972

Inventor(s) Dieter Arlt, Hermann Hagemann and Peter Hoffmann and Ivar Ugi

It is certified that error appears in the above-identified patent and that said Letters Patent are hereby corrected as shown below:

Col. 1, Line 61, "AcX + NH-" should read -- AcX + R-NH --

Col. 3, line 52, "C./torr" should read -- C./12 Torr --

Col. 3, line 57, "bicargonate" should read -- bicarbonate --

Col. 4, line 62, "275°C" should read -- 25°C --

Col. 6, lines 28, 29, and 30, "464 X" in each instance should read -- 464 X R --

Signed and sealed this 2nd day of January 1973.

(SEAL)
Attest:

EDWARD M. FLETCHER, JR.
Attesting Officer

ROBERT GOTTSCHALK
Commissioner of Patents